United States Patent [19]

Mirels et al.

[11] Patent Number: 5,067,801

[45] Date of Patent: Nov. 26, 1991

[54] TRANSVERSE FLOW AERODYNAMIC LENS

[75] Inventors: Harold Mirels, Rolling Hills Estates; Donald J. Spencer; Robert Hofland, Jr., both of Torrance, all of Calif.

[73] Assignee: The Aerospace Corporation, El Segundo, Calif.

[21] Appl. No.: 318,582

[22] Filed: Mar. 3, 1989

[51] Int. Cl.$^5$ .............................................. G02B 3/14
[52] U.S. Cl. ..................................... 359/666; 359/667
[58] Field of Search ................... 350/418, 419; 372/35

[56] References Cited

PUBLICATIONS

Basu et al., "A Proposed 1 KW Average Power Moving Nd; Glass Laser", IEEE Journal of Quantum Electronics, vol. QE-22, No. 10, 10/1986, pp. 2052–2057.

Primary Examiner—Paul M. Dzierzynski
Assistant Examiner—Rebecca D. Gass
Attorney, Agent, or Firm—William J. Burke

[57] ABSTRACT

This invention describes a method and an apparatus for refracting a laser beam. The beam can be collimated, focused, or expanded in passage through a series of in-line, orthogonally-mounted modules, each of which utilizes a fully-developed thermal boundary layer within a flow, between two cooled (or heated) parallel plates to produce beam refraction. The laser beam, in passage through this device, traverses only fully-developed thermal boundary layers which generate parabolic density and refractive index profiles, hence produce an undistorted gas lens. Two (three) diverger modules can be mounted in line to produce an emerging beam which is an undistorted, spherical-wave-front diverging (or collimated or focused) beam of elliptical (circular) cross section and the same beam quality as the input beam. This gas lens is usable at high beam power densities much above those that conventional optical materials can withstand. Counter flow may be used within each module to compensate for a streamwise index of refraction gradient, if necessary.

3 Claims, 7 Drawing Sheets

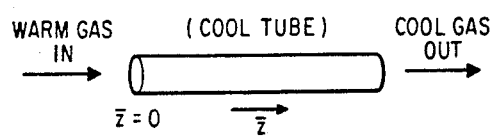
FIG.1 (a) CONFIGURATION OF REF. 1 (PRIOR ART)
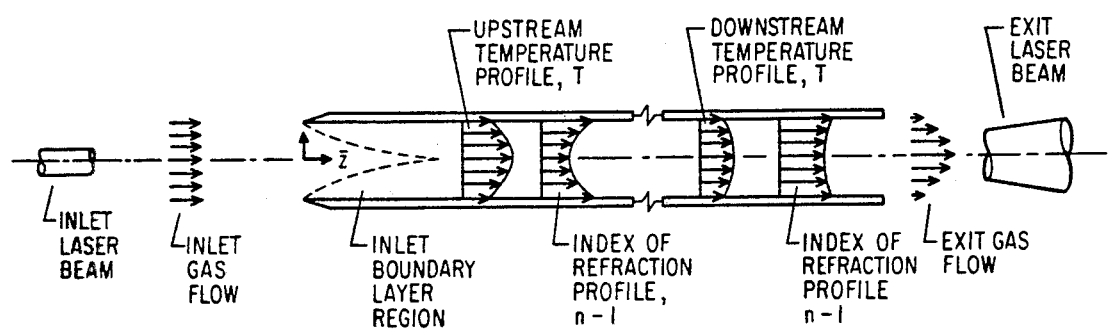
FIG.1 (b) TEMPERATURE AND INDEX OF REFRACTION PROFILES (PRIOR ART)

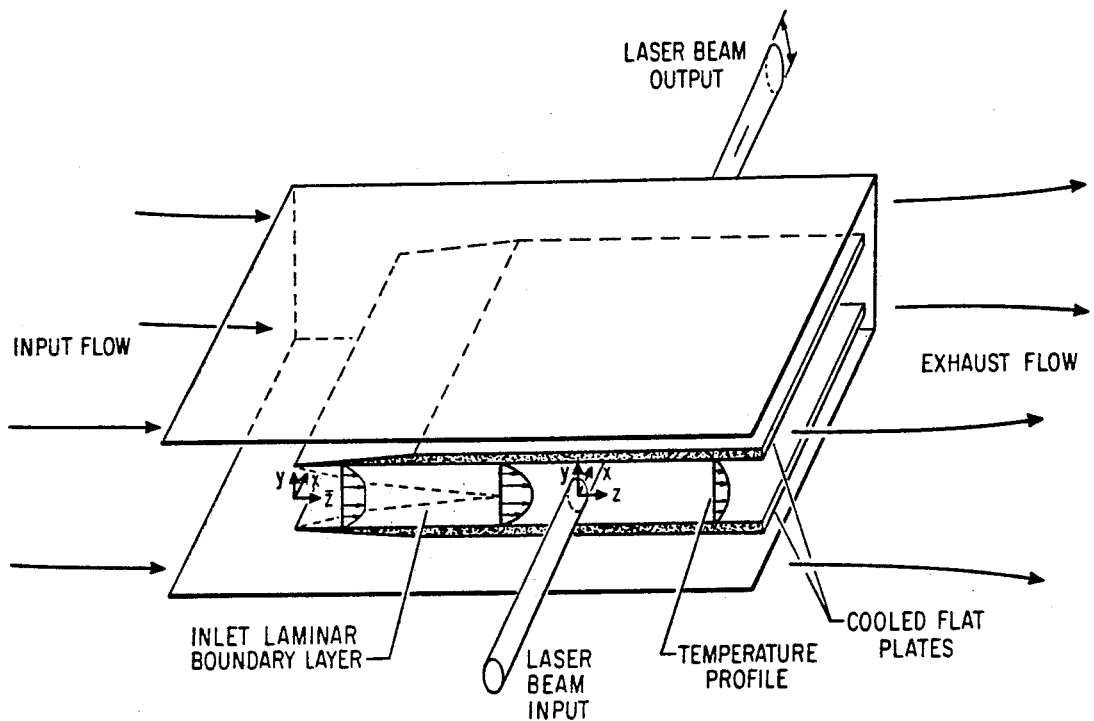
FIG. 2 (a) CONFIGURATION
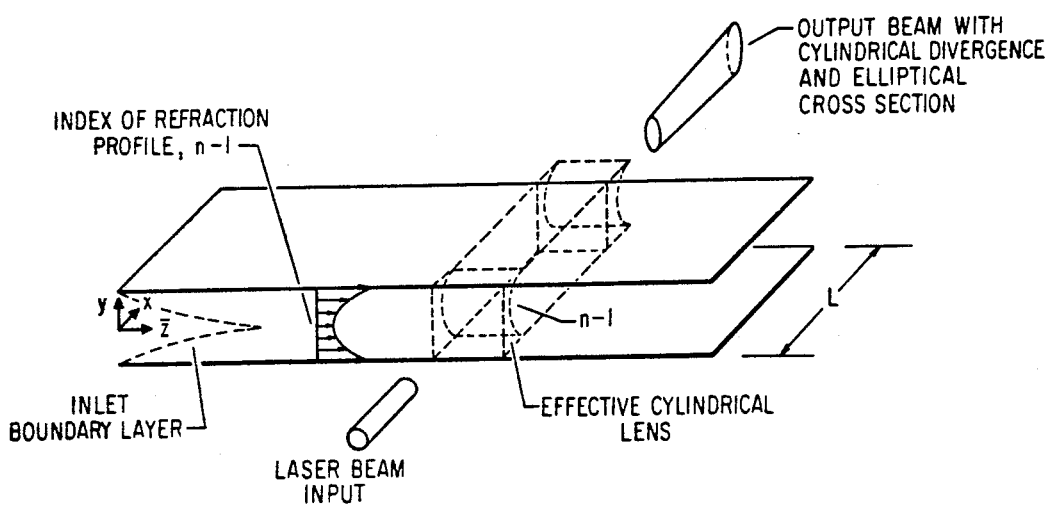
FIG. 2 (b) EFFECTIVE CYLINDRICAL LENS

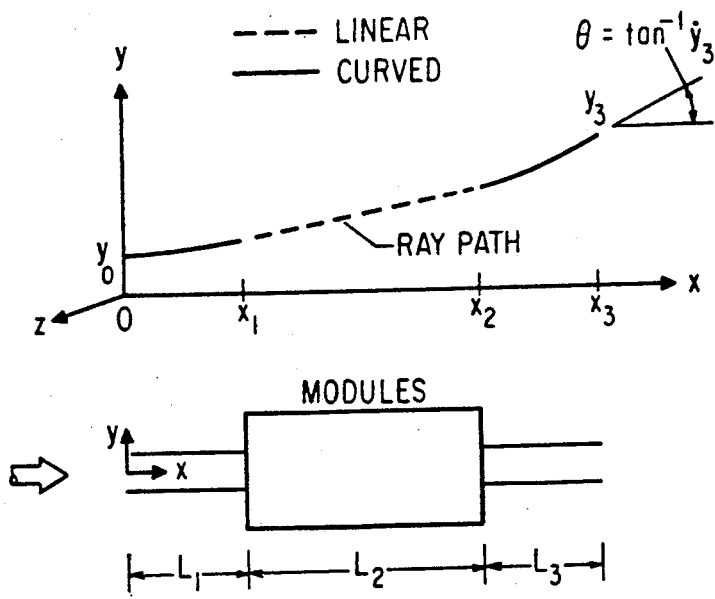
FIG. 5 (a) END VIEW
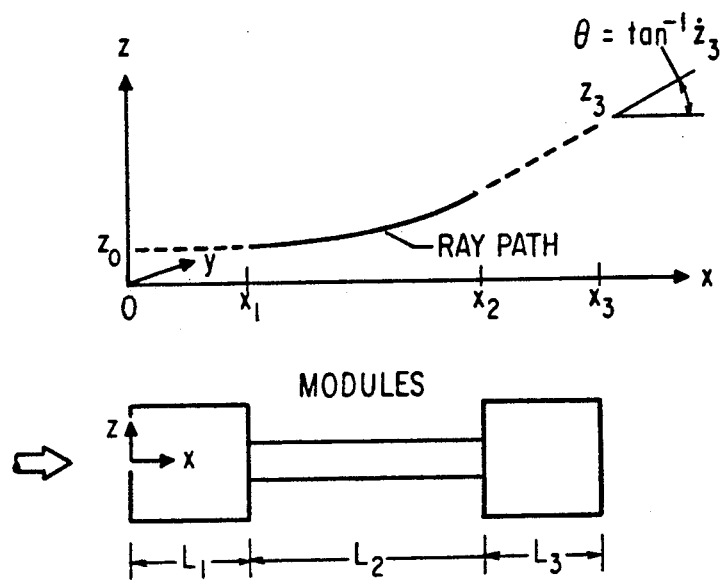
FIG. 5 (b) BOTTOM VIEW

TRANSVERSE FLOW AERODYNAMIC LENS

STATEMENT OF GOVERNMENT INTEREST

The invention described herein may be manufactured and used by or for the Government of the United States for governmental purposes without the payment of royalty therefor.

BACKGROUND OF THE INVENTION

1. Field of the Invention

The invention relates to a method and apparatus for focusing, collimating or expanding a beam of laser light.

2. Description of the Prior Art

It is known that gases transported within a tube can act to diverge, collimate or to focus a beam of light directed along the axis of the tube. It is also known that high intensity light can damage solid lenses. Thus, a lens constructed using a gas with low light absorption is of interest in such circumstances because of its ability to accommodate high light intensities that would otherwise damage solid lenses. Such lenses are an important element in any ground-based or space-based, high-power free electron laser system. However, gas lenses that have been proposed to date tend to introduce aberrations in the optical beam and degrade its optical quality in a way that is difficult to correct, even for low intensity light beams.

For example, a pipe flow gas lens concept has been proposed by Marcuse, et al. of Bell Laboratories (D. Marcuse and S. E. Miller, "Analysis of a Tubular Gas Lens," the Bell System Technical Journal, July 1964, pp. 1758-1782). In this concept, a laser beam is propagated through a cooled rotating pipe which confines a relatively warm flowing gas (FIG. 1a). As shown in FIG. 1b, the radial temperature variation of the gas flowing in the pipe produces a radial refractive index variation which corresponds to a negative optical lens. The use of a warm pipe and a relatively cool gas, as discussed in REF. 1, produces a positive optical lens.

There are several shortcomings associated with this type device. First, the radial variation of the index of refraction is not parabolic in the pipe inlet boundary-layer region. This non parabolic index variation produces aberrations that degrade beam quality. Second, at high optical intensities, these devices are susceptible to distortions caused by heating of the gas and thermal blooming because of the long dwell time of the gas in the laser beam path. The amount of distortion increases as the beam travels along the optic axis. Third, these devices are not scaleable because optical power is reduced in the downstream flow region due to gas-wall temperature equilibration, as indicated in FIG. 1b.

Another device is proposed by McConnel in U.S. Pat. No. 4,402,274. This device is similar to the Marcuse invention in that the laser beam is propagated along the axis of an axisymmetric flow field. However, unlike Marcuse, the radial density gradient is generated by a vortex, rather than by a heating or cooling the tube walls of the containment tube, as is done by Marcuse.

The principal shortcoming of the above aerolens devices which incorporate axisymmetric flow fields is that they do not produce a true parabolic lens profile. Thus, laser beam quality is degraded in passage through these devices.

It is therefor an object of the present invention to generate a gas lens which is characterized by negligible distortion.

It is also an object of the invention to maintain negligible distortion independent of distance along the optic axis.

It is another object of the invention to accommodate high power laser beams with minimum heat absorption and nonlinear optical effects.

It is yet another object of this invention to provide a configuration which is readily scaleable.

SUMMARY OF THE INVENTION

The present invention utilizes a fully-developed thermal boundary layer within a flow between two cooled (or heated) parallel plates to generate a parabolic refractive index profile which functions as a gas lens.

BRIEF DESCRIPTION OF THE DRAWINGS

FIG. 1a is a schematic diagram of a prior art pipe flow aerolens. FIG. 1b illustrates a negative (divergent) aerolens.

FIG. 2a is a schematic diagram of one module of the present invention. FIG. 2b illustrates this configuration with a collimated input beam with circular cross section, and exit beam with cylindrical divergence and elliptical cross section.

FIG. 5a is an end view of ray path tracings through orthogonal components of a three unit aerolens. FIG. 5b is a bottom view of ray path tracings through the aerolens.

DETAILED DESCRIPTION OF THE PREFERRED EMBODIMENT

A high quality gas lens module, for control of a laser beam, is established by generating a fully-developed thermal boundary-layer gas flow between two cooled parallel plates as indicated in FIG. 2a. A heated gas flow enters the region between the two cooled parallel plates. The heated gas is at a controlled, uniform temperature. The cooled parallel plates are perforated with an array of parallel cooling passages. Liquid oxygen or liquid nitrogen at one atmosphere pressure is flowed through these passages in order to maintain constant wall temperature. All sides of both cooled parallel plates are insulated, except for surfaces exposed to the gas flow, to ensure a uniform temperature distribution over these surfaces where the thermal boundary layer develops.

Figure 3:
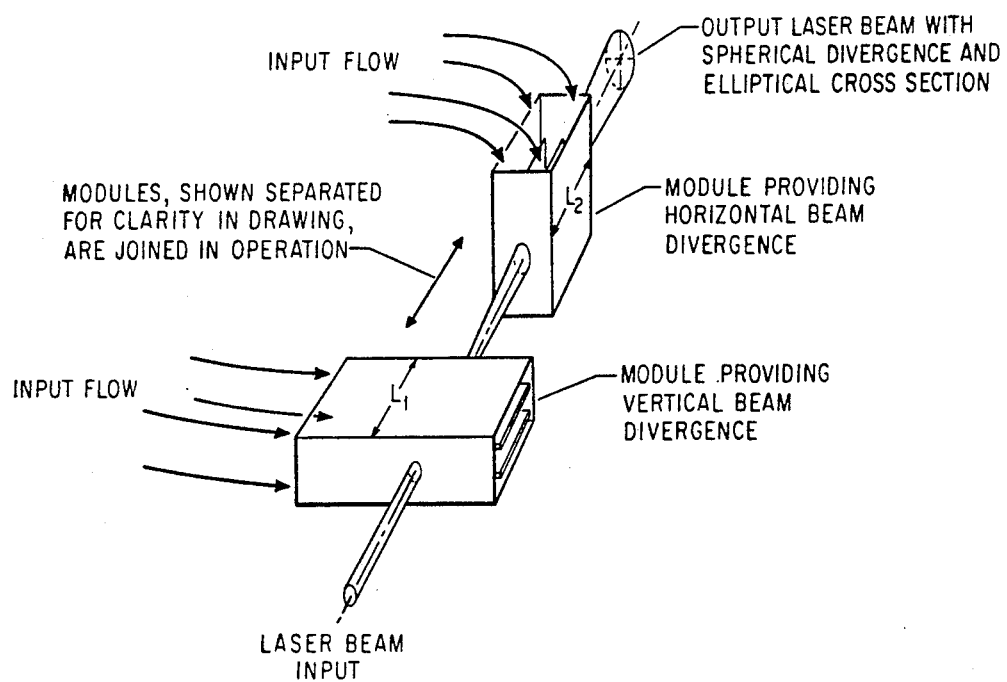
FIG. 3 is a schematic diagram of two orthogonal modules of the present invention. For the case of a collimated input beam with circular cross section, these modules provide an exit beam with spherical divergence and elliptical cross section.
Figure 4:
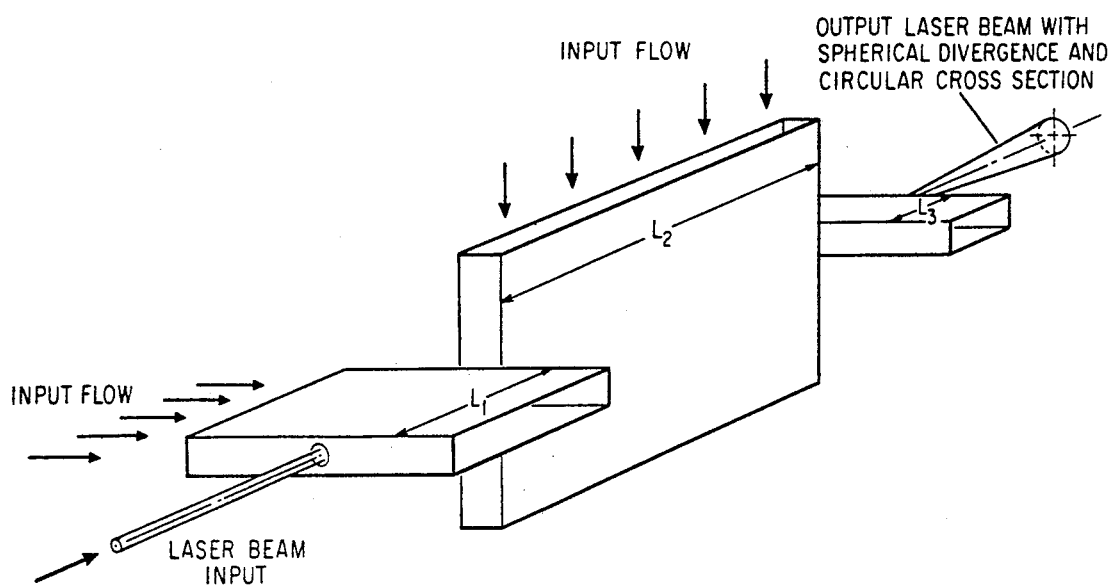
FIG. 4 is a schematic diagram of a three module aerolens configuration. For the case of a collimated input beam with circular cross section, this configuration provides an exit beam with spherical divergence and circular cross section.

When a laser beam is propagated transverse to the flow direction, in the fully developed thermal boundary layer region, an undistorted and stable cylindrical divergence of the beam is produced as shown in FIG. 2b. When assembled in modular fashion, and mounted in line with the laser beam path and with gas flow directions orthogonal to one another, two such units provide an exit beam with a spherical wave front and an elliptical cross section as shown in FIG. 3. As shown in FIG. 4, three diverger units can be mounted in line to generate an exit beam with a spherical wavefront and a circular cross section, functioning as a single spherical diverging lens in which the beam quality of the initial beam is preserved in passage through the aerolens. The aerolens array depicted in FIG. 4 may be considered a three module system in which the central module, operating on the z beam component, is sandwiched between and orthogonal to the two book-end modules that operate on the y beam component. A schematic representation of ray path tracings through a three-module aerolens system is shown in FIG. 5.

The thermal boundary layer growth along the flow direction is described, approximately, by the following equation $$\delta_{th} = 5(\mu \bar{z}/\rho v)^{\frac{1}{2}} P_R^{\frac{1}{3}} \quad (1a)$$

$$= 5(k\bar{z}/\rho v C_p)^{\frac{1}{2}} \text{ when } P_R = \mu C_p/k = 1 \quad (1b)$$

where $\bar{z}$ denotes streamwise distance measured from the leading edge of the cooled plate, $\delta_{th}$ is the thermal boundary layer thickness, v is the gas velocity in the streamwise direction, and $\mu$, k, $\rho$ and $C_p$ are the gas viscosity, thermal conductivity, density and heat capacity, respectively. The latter gas properties are based on the average boundary layer temperature. The thermal boundary layer development is shown schematically by the labeled dashed curve in FIG. 6.

Boundary layer closure occurs when $2\delta_{th} = D$ where D is the plate separation distance. The corresponding streamwise location is denoted $\bar{z}_c$ and is found from $$\bar{z}_c/v = (D^2/100)(\rho C_p/k) \quad (2)$$

Figure 6:
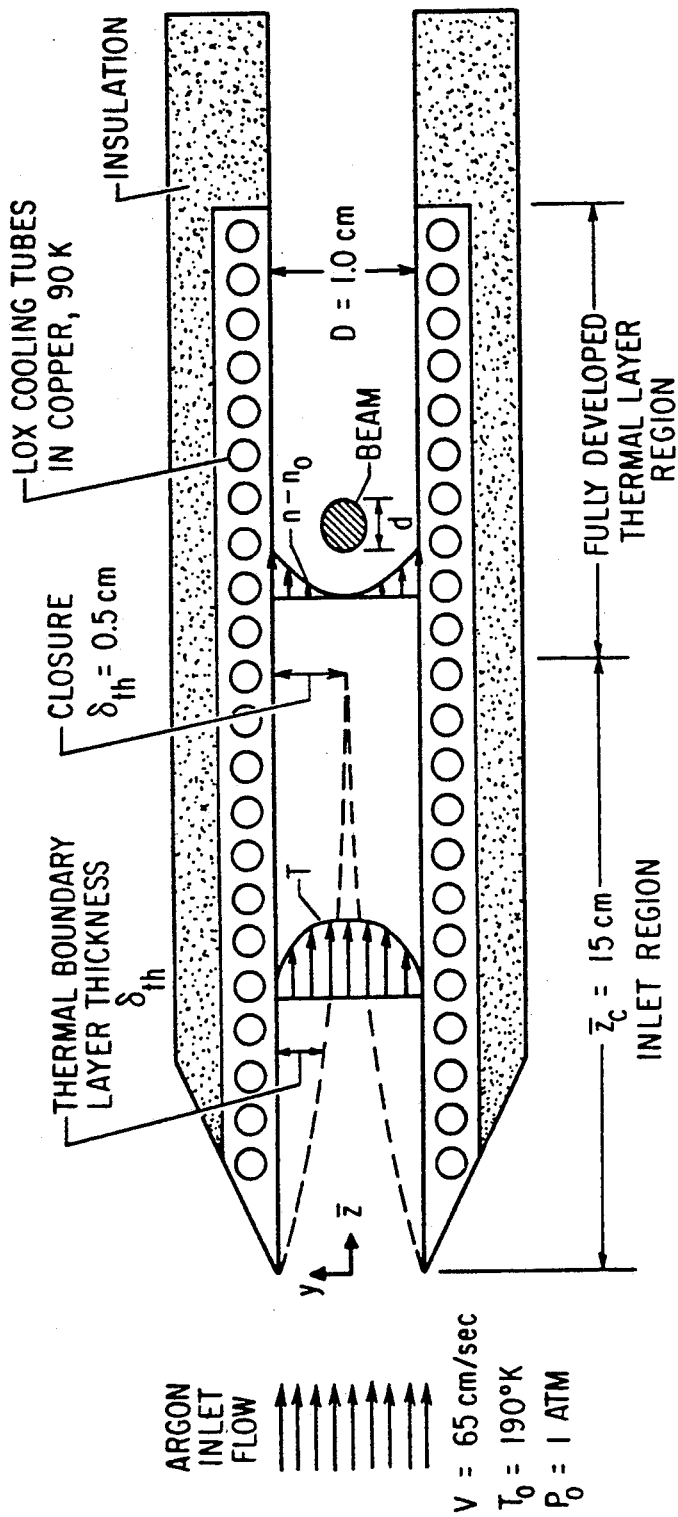
FIG. 6 is a schematic diagram showing thermal boundary layer growth between two cooled plates.

Note that for fixed D and gas properties, $\bar{z}_c$ varies linearly with v. Downstream of the boundary layer closure region the fluid temperature profile may be approximated by $$\frac{T_0 - T}{T_0 - T_w} = (2y/D)^2 \quad (3)$$

where $T_0$ and $T_w$ denote local centerline and local wall temperatures, respectively, and y denotes lateral distance from the centerline. Assuming an ideal gas and a negligible pressure variation in the y direction, the corresponding index of refraction variation is $$\frac{n - n_0}{n_w - n_0} = (2y/D)^2 (T_w/T) \quad (4)$$

which is illustrated in FIG. 6. An optical beam, of diameter $d << D$, which propagates in the x direction, encounters an essentially parabolic index variation given by $$\frac{n - n_0}{n_w - n_0} = (2y/D)^2 (T_w/T_0)[1 + O(1 - T_w/T_0)(d/D)^2] \quad (5)$$

where the error term indicates a departure from the parabolic distribution. The error term can be minimized by geometry (i.e., $(d/D)^2 << 1$) and by judicious streamwise location of the optical axis. The index variation in Equation (5) is equivalent to a diverging cylindrical lens when $T_w < T_o$ (i.e., $n_w > n_o$) and is equivalent to a converging cylindrical lens when $T_w > T_o$ (i.e., $n_w < n_o$).

In one embodiment of the invention, the gas is argon. A 190 K. argon gas flow of 65 cm sec$^{-1}$ velocity, cooled to 90 K. at the walls, becomes a fully-developed thermal boundary layer at $\bar{z}_c = 15$ cm when the cooled-plate separation distance is 1 cm. In this case $\bar{z}_c$ can be varied by varying flow velocity v in accord with the relation $\bar{z}_c = 0.23$ v cm.

Figure 7:
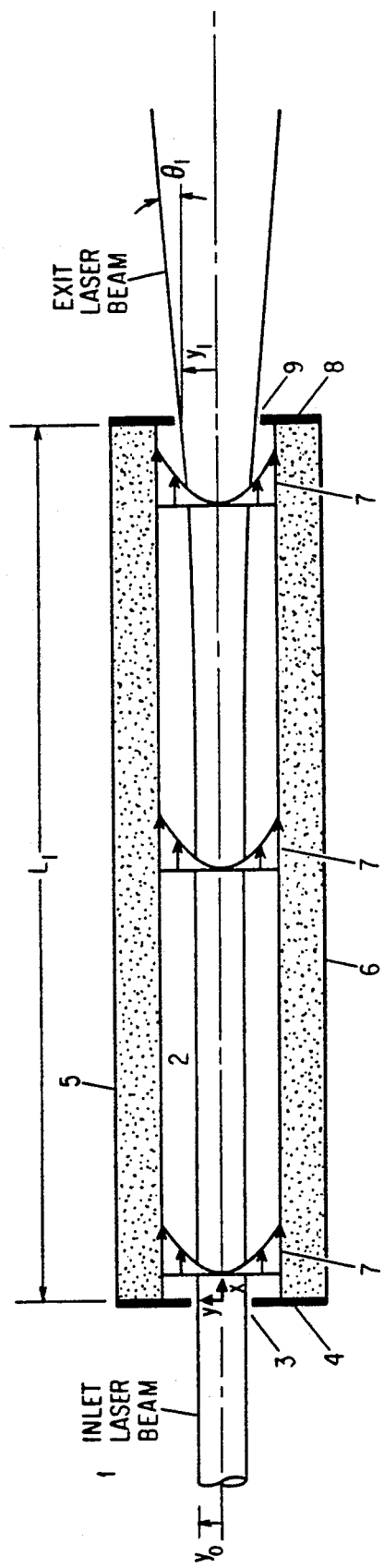
FIG. 7 is a schematic diagram showing laser beam path within first module.

The cylindrical diverging gas lens formed along the line approximately 15 cm downstream of the leading edge of the cooled plates in FIG. 5 is illustrated in FIG. 7. In FIG. 7, the inlet laser beam 1, of semi-height $y_o$, enters the flow region 2 through an aperture 3 contained in a sidewall 4. The aperture radius is only slightly larger than the inlet beam radius, $y_o$. The flow is in the z direction which is perpendicular to the plane of the figure. The sidewall 4 is constructed from thermal insulator material so as to provide a minimum perturbation of the fluid temperature distribution. The flow is bounded by an upper-cooled-plate 5 and a lower-cooled-plate 6. The index of refraction profile, 7, in terms of $n - n_o$, is parabolic in the y direction and has the same magnitude at each station along the laser beam path. The index of refraction does not vary in the z (streamwise) direction. As a result of the index variation in the y direction, the laser beam diverges in this direction and has an exit height $y_1$ and an exit slope $\theta_1$. The sidewall at the exit 8 has an aperture 9 which is slightly larger than the laser beam exit dimension, $y_1$. The z coordinate of each laser beam ray is unaffected by the flow in the module as a consequence of the assumption that there is not streamwise variation in the index of refraction.

For the case of a module with a collimated input beam, of half height $y_o$, the exit half height $y_1$ and the exit slope $\theta_1 \equiv \dot{y}_1 \equiv dy_1/dx$ are given by the expressions $$y_1/y_o = \cosh (L_1 A_1) \quad (6)$$

$$\dot{y}_1/(A_1 y_o) = \sinh (L_1 A_1) \quad (7)$$

The output beam has a cylindrical wavefront of radius R given by $$\frac{1 + O(y_1/R)^2}{R} = \frac{\dot{y}_1}{y_1} = A_1 \tanh (A_1 L_1) \quad (8)$$

where terms of order $(y_1/R)^2$ have been neglected. The quantity $A_1$ is calculated from the aerolens geometry and gas properties by means of the equation $$A_1 = [2 (n_w - n_o) (2/D)^2]_1^{\frac{1}{2}} \quad (9)$$

$$= [0.61 P (T_o - T_w)/(D^2 T_o T_w)]_1^{\frac{1}{2}} \text{ cm}^{-1}$$

where D (cm) is the cooled parallel plate separation distance,
P (atm) is the gas pressure, $T_o$ (K) and $T_w$ (K) are the gas centerline and wall temperatures, respectively. The $z$ coordinate of a ray is unaffected by the module. Thus, an input beam with a circular cross section will have an elliptical cross section, with a ratio of major to minor axis equal to $\cosh L_1 A_1$, at the exit of the module. Equations (1) through (9) permit design of a single transverse-flow aerolens diverger module assuming a collimated input beam. For the input values $y_o = 0.1$ cm, $D = 1$ cm, $P = 1$ atm, $T_o = 190$ K., $T_w = 90$ K. (LOX temperature) and $L_1 = 21.4$ cm, it is found that $A_1 = 0.060$ cm$^{-1}$, $y_1 = 0.19$ cm and $\dot{y}_1 = 10$ mrad.

Equations (6) and (7) can be generalized to describe beam divergence in each module of a multiple module configuration. It is convenient to define a streamwise z coordinate system reference to the beam centerline (FIG. 2a). Let $x_{i-1}$ and $x_i$ denote the beam inlet and exit station, respectively, for module i. The notation is illustrated in FIG. 5. Assuming a parabolic refractive index variation in the $\pm y$ direction (e.g., FIG. 2b), inlet and exit beam properties are related by $$y_i = y_{i-1} \cosh A_i L_i + (\dot{y}_{i-1}/A_i) \sinh A_i L_i \quad (10a)$$
$$\dot{y}_i = y_{i-1} A_i \sinh A_i L_i + \dot{y}_{i-1} \cosh A_i L_i \quad (10b)$$
$$z_i = z_{i-1} + \dot{z}_{i-1} L_i \quad (10c)$$
$$\dot{z}_i = \dot{z}_{i-1} \quad (10d)$$

where $L_i \equiv x_i - x_{i-1}$ is the width of the module and $(\dot{\ }) = d(\ )/dx$ The quantity $A_i$ is evaluated from Eq. (9) using properties of the ith module. The quantities y and z are reversed in Eq. (10) for the case where the parabolic index variation is in the $\pm z$ direction, as in module 2 of FIG. 4.

For the case of two modules with a collimated inlet beam, as indicated in FIG. 3, inlet and exit beam properties are thus related by $$y_2/y_0 = \cosh A_1 L_1 + A_2 L_2 (A_1/A_2) \sinh A_1 L_1 \quad (11a)$$
$$\dot{y}_2/(A_2 y_0) = (A_1/A_2) \sinh A_1 L_1 \quad (11b)$$
$$z_2/z_0 = \cosh A_2 L_2 \quad (11c)$$
$$\dot{z}_2/(A_2 z_0) = \sinh A_2 L_2 \quad (11d)$$

The exit beam will have a spherical wave front of radius R if $$\frac{1}{R} = \frac{\dot{y}_2}{y_2} = \frac{\dot{z}_2}{z_2} \quad (12)$$

where terms of order $(y_2/R)^2$ and $(z_2/R)^2$ are neglected. If the inlet beam has a circular cross section, the exit beam will have an elliptical cross section with the ratio of major to minor axis equal to $y_2/z_2$. If $A_1$, $A_2$ and R are specified, Eqs. (12) provide two equations for $L_1$ and $L_2$. Other properties are found from Eqs. (11). For the case $A_1 = A_2 \equiv A$, it is found that $$AL_2 = \coth^{-1}(AR) \quad (13a)$$
$$AL_1 = \coth^{-1}(AR - AL_2) \quad (13b)$$

Numerical results for this case are given in Table 1. These results were obtained by specifying $\dot{z}_2/(Az_2)$ and obtaining $AL_2$ from Eq. (11d). Other variables were then obtained from Eqs. (11) to (13). Eq. (13b) requires $A(R - L_2) \geq 1$ which results in the requirements $AR \geq 1.6837$, $AL_2 \leq 0.6837$, and $AL_1 \leq 5.5520$. It follows that $\dot{z}_2/(Az_2) \leq 0.7383$, $z_2/z_0 \leq 1.2430$, $y_2/(Ay_2) \leq 128.87$ and $\dot{y}_2/y_0 \leq 216.98$. These limitations do not affect the ability to design a two module aerolens since the quantity A is a design variable. The larger the value of A, the smaller the values of $L_1$ and $L_2$ required to achieve a given divergence, and the more nearly each module acts like a thin (rather than a thick) lens.

In the case of three modules with a collimated inlet beam, as in FIG. 4, inlet and exit beam properties are related by $$y_3/y_0 = [\cosh A_1 L_1 + (A_2 L_2)(A_1/A_2) \sinh A_1 L_1] \cosh A_3 L_3 + (A_1/A_3) \sinh A_1 L_1 \sinh A_3 L_3 \quad (14a)$$
$$\dot{y}_3/(A_3 y_0) = [\cosh A_1 L_1 + L_2 A_2(A_1/A_3) \sinh A_1 L_1] \sinh A_3 L_3 + (A_1/A_3) \sinh A_1 L_1 \cosh A_3 L_3 \quad (14b)$$
$$z_3/z_0 = \cosh A_2 L_2 + A_3 L_3(A_2/A_3) \sinh A_2 L_2 \quad (14c)$$
$$\dot{z}_3/(A_3 z_0) = (A_2/A_3) \sinh A_2 L_2 \quad (14d)$$

The exit beam will have a spherical wave front of radius R if $$\frac{1}{R} = \frac{\dot{y}_3}{y_3} = \frac{\dot{z}_3}{z_3} \quad (15a)$$

If the input beam is circular, the exit beam will have a circular cross section provided $$\frac{y_3}{y_0} = \frac{z_3}{z_0} \quad (15b)$$

When R, $A_1$, $A_2$ and $A_3$ are specified, Eqs. (15) provide three equations for $L_1$, $L_2$ and $L_3$. The solution of these equations is simplified if the practical assumption $A_1 = A_1 = A_3 \equiv A$ is made. Numerical results for this case are given in Table 2. These results were obtained by specifying $\dot{y}_3/(Ay_0) = \dot{z}_3/(Az_0) \equiv \dot{r}_3/(Ar_0)$, obtaining $AL_2$ from Eq. (14d) and then obtaining the remaining variables from Eqs. (14) and (15). There does not appear to be a mathematical limitation on allowed values for $\dot{r}_3/(Ar_0)$. For small exit values of $\dot{y}/(Ay_0)$ and $\dot{z}/(Az_0)$, the two and three module aerolens configurations give similar performance. In these cases, the two module configuration is simpler and is preferable. With increase in exit divergence, the overall length of the three module system is greater than that of the two module system for a given value of A. However, the three module system provides an exit beam with a circular cross section.

TABLE 1

A table of values which allow design of a two module aerolens with spherical wavefront and elliptical cross section output. See Eqs. 11 to 13. Note $A_1 = A_2 = A$. A collimated input beam is assumed.

| $\dfrac{\dot{z}_2}{Az_0}$ | $\dfrac{z_2}{z_0}$ | $\dfrac{\dot{y}_2}{Ay_0}$ | $\dfrac{y_2}{y_0}$ | $AL_1$ | $AL_2$ | $A(L_1 + L_2)$ | $\dfrac{1}{AR}$ | $\dfrac{y_2}{z_2} - 1$ |
|---|---|---|---|---|---|---|---|---|
| 0.000 | 1.000 | 0.000 | 1.000 | 0.000 | 0.000 | 0.000 | 0.000 | 0.000 |
| 0.100 | 1.005 | 0.101 | 1.015 | 0.101 | 0.100 | 0.201 | 0.100 | 0.010 |

TABLE 1-continued

A table of values which allow design of a two module aerolens with spherical wavefront and elliptical cross section output. See Eqs. 11 to 13. Note $A_1 = A_2 = A$. A collimated input beam is assumed.

| $\dfrac{z_2}{Az_0}$ | $\dfrac{z_2}{z_0}$ | $\dfrac{y_2}{Ay_0}$ | $\dfrac{y_2}{y_0}$ | $AL_1$ | $AL_2$ | $A(L_1 + L_2)$ | $\dfrac{1}{AR}$ | $\dfrac{y_2}{z_2} - 1$ |
|---|---|---|---|---|---|---|---|---|
| 0.200 | 1.020 | 0.208 | 1.063 | 0.207 | 0.199 | 0.406 | 0.196 | 0.042 |
| 0.300 | 1.044 | 0.331 | 1.151 | 0.325 | 0.296 | 0.621 | 0.287 | 0.103 |
| 0.400 | 1.077 | 0.482 | 1.298 | 0.465 | 0.390 | 0.855 | 0.371 | 0.205 |
| 0.500 | 1.118 | 0.693 | 1.551 | 0.647 | 0.481 | 1.129 | 0.447 | 0.387 |
| 0.600 | 1.166 | 1.060 | 2.060 | 0.923 | 0.569 | 1.492 | 0.514 | 0.767 |
| 0.700 | 1.221 | 2.291 | 3.995 | 1.567 | 0.653 | 2.219 | 0.573 | 2.273 |
| 0.710 | 1.226 | 2.697 | 4.659 | 1.718 | 0.661 | 2.379 | 0.579 | 2.799 |
| 0.720 | 1.232 | 3.396 | 5.811 | 1.937 | 0.669 | 2.606 | 0.584 | 3.716 |
| 0.730 | 1.238 | 5.111 | 8.668 | 2.334 | 0.677 | 3.011 | 0.590 | 6.001 |
| 0.738 | 1.243 | 30.381 | 51.164 | 4.107 | 0.684 | 4.791 | 0.594 | 40.167 |

TABLE 2

A table of values which allow design of a three module aerolens with spherical wavefront and circular cross section output. See Eqs. 14 and 15. Note $A_1 = A_2 = A_3 = A$. Due to circular symmetry, y and z have been replaced by $r = (y^2 + z^2)^{\frac{1}{2}}$. A collimated input beam is assumed.

| $\dfrac{r_3}{Ar_0}$ | $\dfrac{r_3}{r_0}$ | $AL_1$ | $AL_2$ | $AL_3$ | $A(L_1 + L_2 + L_3)$ | $\dfrac{1}{AR}$ |
|---|---|---|---|---|---|---|
| 0.000 | 1.000 | 0.000 | 0.000 | 0.000 | 0.000 | 0.000 |
| 0.200 | 1.039 | 0.099 | 0.199 | 0.097 | 0.395 | 0.192 |
| 0.400 | 1.150 | 0.195 | 0.390 | 0.182 | 0.767 | 0.348 |
| 0.600 | 1.315 | 0.285 | 0.569 | 0.248 | 1.102 | 0.456 |
| 0.800 | 1.519 | 0.369 | 0.733 | 0.298 | 1.399 | 0.527 |
| 1.000 | 1.749 | 0.446 | 0.881 | 0.335 | 1.661 | 0.572 |
| 1.200 | 1.997 | 0.517 | 1.016 | 0.362 | 1.895 | 0.601 |
| 1.400 | 2.258 | 0.583 | 1.138 | 0.384 | 2.104 | 0.620 |
| 1.600 | 2.528 | 0.644 | 1.249 | 0.401 | 2.294 | 0.633 |
| 1.800 | 2.806 | 0.701 | 1.350 | 0.415 | 2.466 | 0.642 |
| 2.000 | 3.088 | 0.755 | 1.444 | 0.426 | 2.624 | 0.648 |
| 2.200 | 3.375 | 0.805 | 1.530 | 0.436 | 2.770 | 0.652 |
| 2.400 | 3.665 | 0.853 | 1.609 | 0.444 | 2.906 | 0.655 |
| 2.600 | 3.958 | 0.898 | 1.684 | 0.451 | 3.032 | 0.657 |
| 2.800 | 4.253 | 0.941 | 1.753 | 0.457 | 3.151 | 0.658 |
| 3.000 | 4.550 | 0.982 | 1.818 | 0.462 | 3.262 | 0.659 |
| 100.000 | 158.373 | 3.677 | 5.298 | 0.584 | 9.559 | 0.631 |

Figure 8:
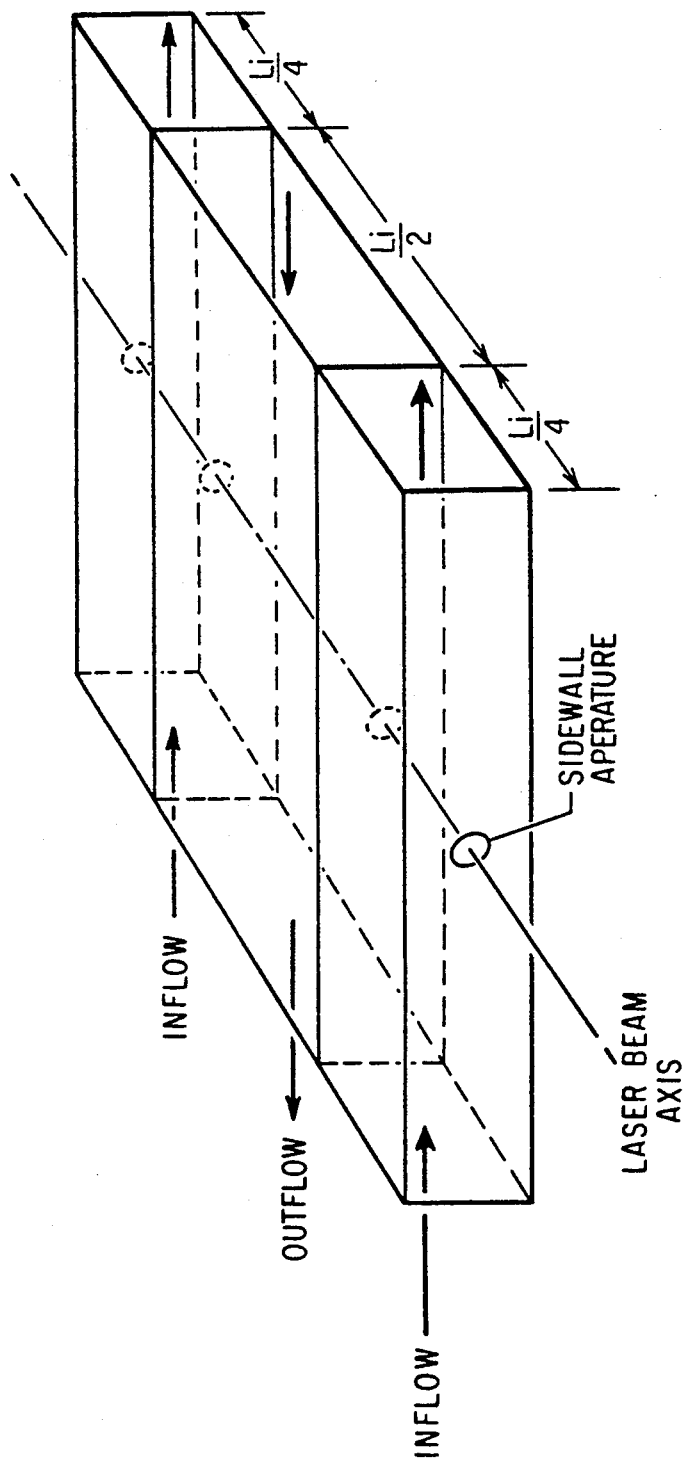
FIG. 8 is a schematic diagram to indicate the use of counter flow to compensate for a linear streamwise variation of index of refraction. A single module is shown. The central section has twice the width of the two end sections.

Eqs. 10 neglect the effect of a streamwise variation of the index of refraction. The latter variation can be caused by wall shear induced pressure gradient, by wall heat transfer induced centerline temperature gradient and by laser heating of the flowing gas. A linear streamwise index of refraction variation acts like a wedge and tends to tilt the laser beam. This effect can be compensated for by the subdivision of each module into three sections with counterflow in the central section as indicated in FIG. 8. The width of the central section is twice the width of each end section. The configuration in FIG. 8 provides exact compensation for a linear streamwise variation in refractive index. It is preferable, however, to avoid significant streamwise gradients by judicious choice of flow variables. For example, an increase in flow velocity v will reduce the streamwise temperature gradient.

Each module requires at least two sidewalls (e.g., FIGS. 4, 6 and 8). Each sidewall requires an aperture to allow transit of the laser beam. The sidewalls and apertures are potential sources of beam quality degradation. This degradation can be minimized by: (a) use of thermal insulator sidewall material so as to minimize the sidewall impact on the gas flow temperature profile; (b) use of small sidewall aperture diameters; and (c) use of low values of the design parameter A so as to increase the optical path length within each module and thereby reduce the relative importance of the aperture region. Also, the pressure differential across each aperture should be minimized.

In order to insure that the flow be laminar (i.e., non-turbulent) it is necessary that $$R_e \lesssim O(10^5) \tag{16}$$

where $R_e = \rho v \bar{z}_c / \mu$ is the Reynold's number which characterizes the stability of the flow in the inlet region (FIG. 6). Eq. (1b) can be expressed as $$\delta_{th}/\bar{z}_c = 5/(Re)^{\frac{1}{2}} \tag{17}$$

Thus, for the present example ($z_c = 15$ cm and $\delta_{th} = 0.5$ cm)

$$Re = 2.2 \times 10^4 \tag{18}$$

and the flow is expected to be laminar in the lens interaction region.

In a high power aerolens, argon is chosen as the working fluid in order to minimize heat absorption and nonlinear optical effects.

The preferred embodiment has been described in terms of cooled plates to produce beam divergence. The use of heated plates to produce a reversal in the gas flow temperature gradients and a resultant positive lens may be used for beam collimating or focusing. When $T_w > T_o$, the parameter $A_i$ is imaginary (see Eq. 9) and the hyperbolic functions are replaced by trigonometric functions in Eqs. 6 to 14. Thus, for example, sinh $[i|A|] = \sin |A|$.

It should be evident to one skilled in the art that many changes and modifications can be made in the configuration or uses of the transverse flow aerodynamic lens without departing from the spirit of the present invention.

We claim:

1. A method for producing a gas lens for a high intensity laser beam:
   a. flowing a temperature controlled non-absorbing gas between two parallel plates;
   b. establishing the temperature of the plates so as to generate at a downstream location in the gas a uniform, parabolic gas-density and refractive index profile within a fully developed thermal boundary layer;
   c. propagating a laser beam within the boundary layer of the plates in a direction transverse to the direction of the flow of the gas at said downstream location;

d. adjusting the temperature of the plates, wherein heating the plates to a temperature greater than the gas flow temperature focuses the laser beam and cooling the plates diverges the laser beam, thereby diverging, focusing or collimating the laser beam;

2. A method for producing a gas lens for a high intensity laser beam comprising the steps of:
   a. flowing a temperature controlled non-light absorbing gas between a first set of two parallel plates;
   b. establishing the temperature of the plates so as to generate at a downstream location in the gas a uniform, parabolic gas density and refractive index profile within a fully developed thermal boundary layer;
   c. propagating a laser beam within the boundary layer of the plates in a direction transverse to the direction of the flow of the gas at said downstream location;
   d. adjusting the temperature of the plates, wherein heating the plates to a temperature greater than the gas flow temperature focuses the laser beam and cooling the plates diverges the laser beam, thereby diverging, focusing or collimating the laser beam;
   e. repeating steps a through d, utilizing a second set of parallel plates placed orthogonal to the first set of plates, thereby producing a spherical wave front of elliptical cross section.

3. A method for producing a gas lens for a high intensity laser beam comprising the steps of:
   a. flowing a temperature controlled non-light absorbing gas between a first set of two parallel plates;
   b. establishing the temperature of the plates so as to generate at a downstream location in the gas a uniform, parabolic gas density and refractive index profile within a fully developed thermal boundary layer;
   c. propagating the laser beam within the boundary layer of the plates in a direction transverse to the direction of the follow of the gas at said downstream location;
   d. adjusting the temperature of the plates, wherein heating the plates to a temperature greater than the gas flow temperature focuses the laser beam and cooling the plates diverges the laser beam, thereby diverging, focusing or collimating the laser beam;
   e. repeating steps a through d, utilizing a second set of parallel plates placed orthogonal to the first set of plates, thereby producing a spherical wave front of elliptical cross section;
   f. repeating steps a through d, utilizing a third set of parallel plates placed orthogonal to the second set of plates, thereby producing a spherical wave front of circular cross section.

* * * * *